United States Patent [19]

Dehls

[11] Patent Number: 4,541,362
[45] Date of Patent: Sep. 17, 1985

[54] SQUIRREL-PROOF SELECTIVE BIRD FEEDER

[75] Inventor: Allan W. Dehls, Bridgewater, N.H.

[73] Assignee: Profile Management Services, Inc., Bristol, N.H.

[21] Appl. No.: 545,970

[22] Filed: Oct. 27, 1983

[51] Int. Cl.$^4$ ............................................. A01K 5/00
[52] U.S. Cl. .................................... 119/51 R; 119/63
[58] Field of Search ...................... 119/51 R, 52 R, 59, 119/61, 63, 62

[56] References Cited

U.S. PATENT DOCUMENTS

| | | | |
|---|---|---|---|
| 1,080,436 | 12/1913 | Graham | 119/62 |
| 1,404,251 | 1/1922 | Westenberger et al. | 119/52 R |
| 2,230,058 | 1/1941 | Hornung | 119/51 R |
| 2,426,696 | 9/1947 | Kwash | 119/52 R |
| 2,532,726 | 12/1950 | LaJoie et al. | 119/52 R |
| 2,918,901 | 12/1959 | Poulsen | 119/51 R |
| 2,931,336 | 4/1960 | Cather | 119/52 R |
| 2,965,070 | 12/1960 | Myrick | 119/51 R |
| 3,051,126 | 8/1962 | Merritt et al. | 119/52 R |
| 3,083,687 | 4/1963 | Slaven | 119/51 R |
| 3,104,649 | 9/1963 | Slaven | 119/51 R |
| 3,117,554 | 1/1964 | Taylor | 119/52 R |
| 3,124,103 | 3/1964 | Stainbrook | 119/51 R |
| 3,145,690 | 8/1964 | Bachman | 119/51 R |
| 3,164,130 | 1/1965 | Curtis et al. | 119/51 R |
| 3,241,525 | 3/1966 | Meier | 119/55 |
| 3,590,780 | 7/1971 | Dunbar | 119/51 R |

*Primary Examiner*—Hugh R. Chamblee
*Attorney, Agent, or Firm*—Weingarten, Schurgin, Gagnebin & Hayes

[57] ABSTRACT

A squirrel-proof selective bird feeder includes a metallic hopper having integral side walls and a back wall defining an open front face, an open top, and a feed portal, a translucent window fastened in water-resistant sealing engagement to the open front face, a top having a sandwiched metallic plate slidably mounted in and frictionally retained by the confronting walls of the open top of the hopper, and a spring-loaded perch having an adjustable tension pivotally mounted to the bottom of the hopper and adjacent the feed portal. In the case of a light bird alighting on the perch having a weight less than that needed to overcome the spring force, the perch remains in at least a partially open state allowing access to the feed portal. In the case of a squirrel or heavy bird having a weight that overcomes the spring force, the perch pivots to a closed state that prevents access to the feed portal. An adjustable feed baffle is provided inside the hopper for regulating the flow of feed into the feed portal, and for providing a preselected opening size selected to accommodate any one of plural feed types. A seed deflector is provided inside the hopper to prevent the jamming engagement of the seed with the motion of the perch. A sloping awning is provided exteriorly of the hopper adjacent to the feed portal to help prevent rain damage to the seed, and to help prevent access thereto by undesirable creatures, particularly squirrels. A member is fastened to the back of the hopper for mounting the hopper to a tree or the like.

24 Claims, 8 Drawing Figures

SQUIRREL-PROOF SELECTIVE BIRD FEEDER

FIELD OF THE INVENTION

This invention is directed to the field of husbandry, and more particularly, to a novel squirrel-proof selective bird feeder.

BACKGROUND OF THE INVENTION

Various mechanical devices have been employed to provide feed for various birds, while denying feed to other animals such as squirrels and heavier unwanted birds such as pigeons, grackles, and cowbirds. Such devices are called upon to be operable under adverse weather conditions such as rain and snow; to present an aesthetic appearance; to be rugged in use and to have a long lifetime; to provide an indication when the feed supply is low; to grant access to some birds while denying access to other birds and undesirable animals such as squirrels by guaranteeing selective feeding to only intended birds; to be operable with plural feed types such as peanut hearts, sunflower seeds, while millet, hulled oats, thistle seed, or crushed oyster shells; to prevent in cold weather freezing-induced damage to birds that feed from the feeder; and to generally be incapable of being gnawed through by squirrels and other animals. The heretofore known bird feeders are deficient in one or more of these aspects.

SUMMARY OF THE INVENTION

The novel bird feeder of the present invention includes an open top hopper defining a large internal volume for providing a large supply of bird feed. The hopper is preferably fashioned of a metal that is resistant to the corrosive effect of the elements to provide a rugged and long life construction, and that is substantially incapable of being gnawed through by squirrels. A top member is slidably mounted in the open top of the hopper in close-fitting frictional abutment therewith, and includes a gnaw-proof metallic plate having outside dimensions selected to be just larger than the dimensions of the open top. At least a visibly translucent window is provided along the front wall of the hopper that allows for visual inspection of current seed inventory. A selectively tensioned metallic perch having a gate is pivotally connected to the bottom of the hopper and adjacent the feed portal. The perch rotates between a first position where the gate is biased into at least a partially open state allowing access from the perch to the feed portal, and a second position where the gate is in a closed state and extends entirely across the feed portal thereby preventing access to the bird feed. The tension is selectively provided preferably by a spring that is conveniently adjustable to allow the gate to rotate to the closed state whenever birds or other animals, particularly squirrels, having an intended weight that exceeds the spring tension find their way to the perch. A sloping awning is provided at the bottom of the hopper adjacent the feed portal and helps both to prevent rain damage to the feed and to prevent squirrels from so positioning themselves as to be able to paw the feed supply. A seed deflector is transversely mounted in the internal volume of the hopper to prevent the feed supply from interfering with the operation of the perch. A seed baffle having adjustable openings is mounted in the hopper adjacent the perch. The size of the feed flow openings is conveniently adjustable in a matter of seconds to accommodate any one of various feed types, and the internal disposition of the baffle in the hopper substantially eliminates environmental damage thereto, further ensuring the long life operation of the feeder. A wooden dowel rod is mounted in vertically spaced relation to the perch. In this manner, any moisture present on the webbed feet of birds that alight on the dowel in cold weather fails to freeze, thereby preventing the freezing engagement of the feet with the perch and therewith eliminating any damage to such birds. A mounting arm is fastened to the rear wall of the hopper.

DETAILED DESCRIPTION OF THE DRAWINGS

Other advantages and features of the instant invention will become apparent as the invention becomes better understood by referring to the following exemplary and nonlimiting detailed description of the preferred embodiment, and to the drawings, wherein.

DETAILED DESCRIPTION OF THE PREFERRED EMBODIMENT

Figure 1:
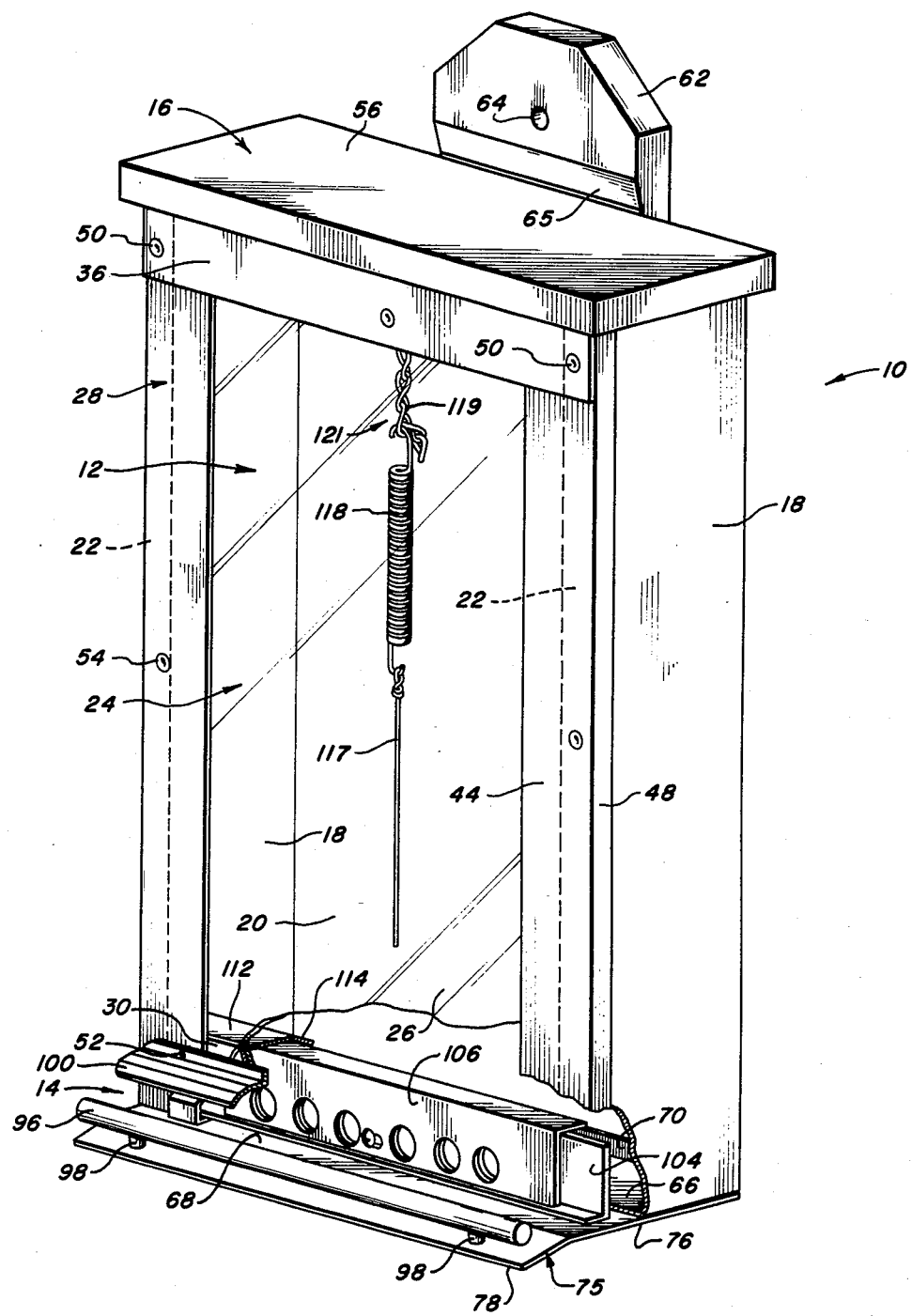
FIG. 1 is a front perspective of the novel squirrel-proof selective bird feeder according to the present invention.
Figure 2:
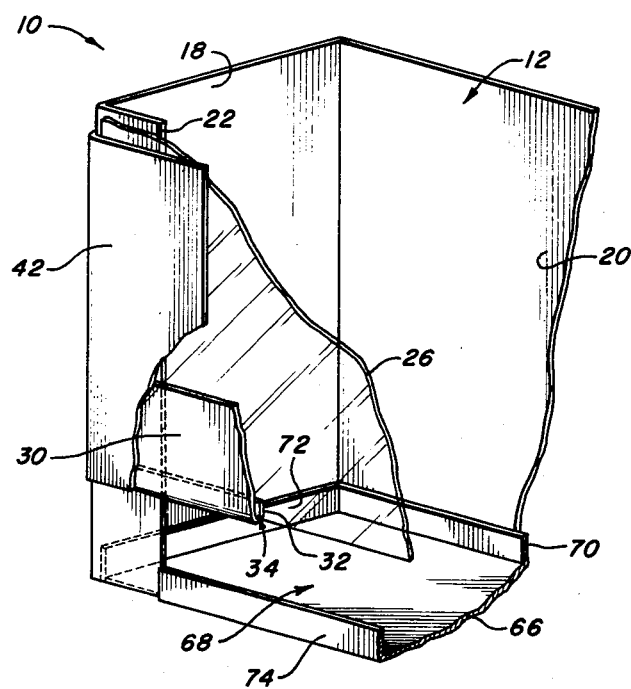
FIG. 2 is a front perspective view of a portion of the bottom of the squirrel-proof selective bird feeder according to the present invention.

Referring now to FIGS. 1 through 7, generally designated at 10 is a novel squirrel-proof selective bird feeder according to the present invention. The bird feeder 10 includes a hopper generally designated 12 having a feed portal at its bottom, a weight-responsive perch adjacent the feed portal generally designated 14 to be described pivotally mounted to the bottom of the hopper 12, and a removable cover generally designated 16 slidably mounted to the top of the hopper 12. The hopper 12 includes a metallic sheet bent at right angles to provide opposed sidewalls 18, a back wall 20, and spaced-apart front flanges 22 defining therebetween a window receiving opening 24.

A window 26 is mounted to the window receiving opening 24 in water-resistant sealing engagement therewith. The window preferably is fashioned from any suitable translucent material so that the outline of the feed level in the hopper can be visually discerned, although it will be appreciated that transparent and ultraviolent opaque materials can also be employed.

A frame generally designated 28 is mounted around the window 26. The frame 28 includes a bottom sill 30 having a longitudinally extending lip 32 defining a channel generally designated 34 dimensioned to slidably receive the bottom edge of the window 26, and a spaced-apart lintel 36 having a longitudinally extending lip 38 defining a channel 40 dimensioned to slidably receive the top end of the window 26. First and second side rails 42, 44 having right angle flanges 46, 48 are provided to the sides of the window 26. The transverse width of the side rails 42, 44 is selected to be greater than the transverse width of the front flanges 22. The flanges 46, 48 extend along a portion of the sides 28 of the hopper 12. The bottom edge of the window 26 is inserted in the channel 34 of the lip 32, and the side rails 42, 44 are respectively positioned one to each side of the hopper 12 and over the corresponding one of the front flanges 22. The top edge of the window 26 is inserted in the channel 40 of the lintel 36. Rivets 50 are provided at spaced-apart points through the lintel 36 and onto the top of the front flanges 22 for fastening it to the hopper 12, and, as appears below, for removably retaining the cover 16. Rivets 52 are fastened to the bottom ends of the front flanges 22 through the side rails 42, 44 for fastening it to the hopper 12. Rivets 54 are provided for fastening the corresponding one of the side rails 42, 44 to the front flanges 22.

Figure 3:
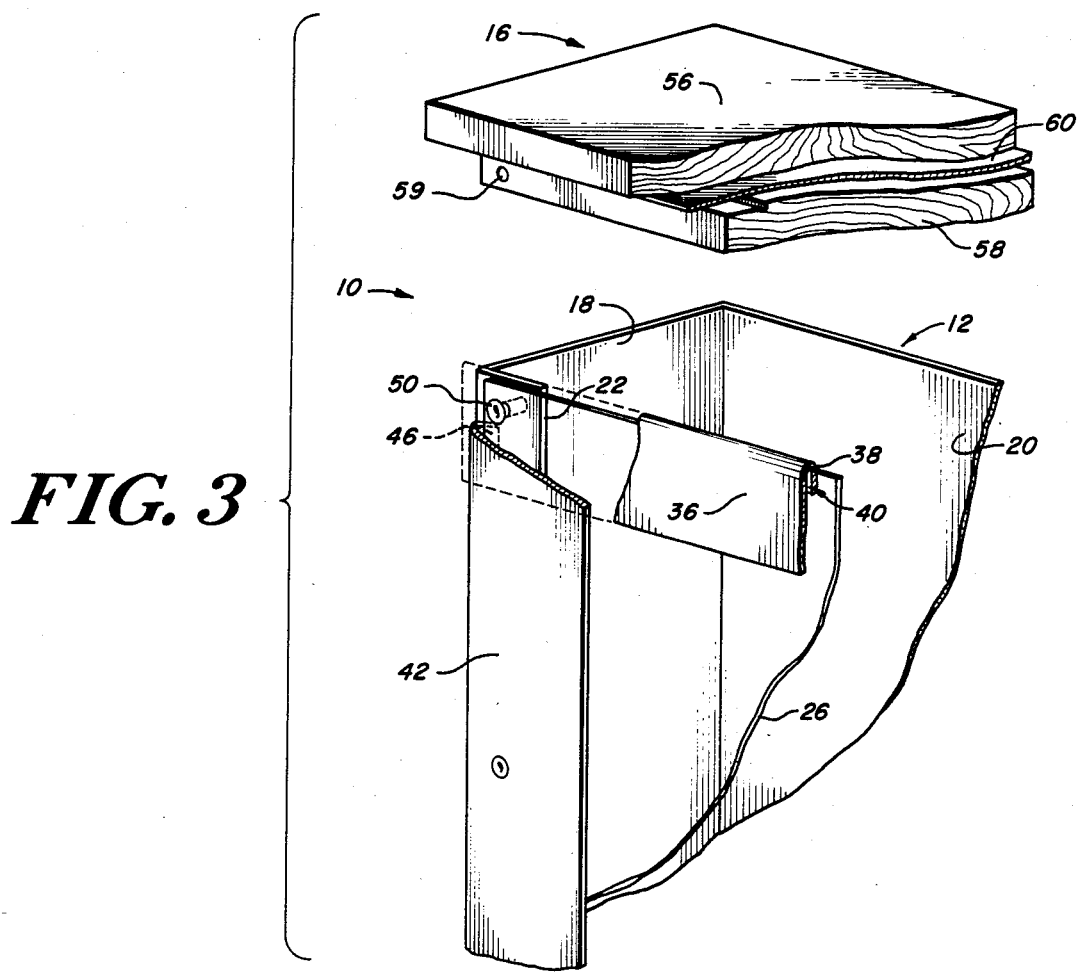
FIG. 3 is an exploded front perspective view of a portion of the top of the squirrel-proof selective bird feeder according to the present invention.
Figure 4A:
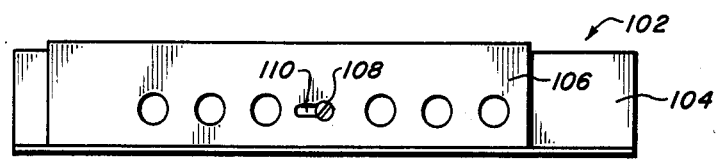
FIG. 4 is a front elevational view of the feed baffle of the squirrel-proof selective bird feeder according to the present invention showing in FIG. 4A the feed baffle in an opened state, and in FIG. 4B the feed baffle in a partially closed state.
Figure 4B:
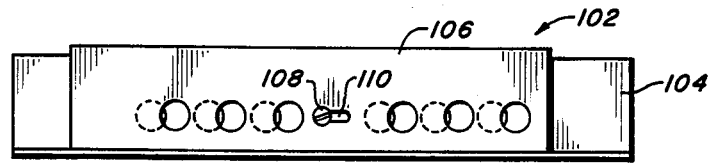
Figure 5:
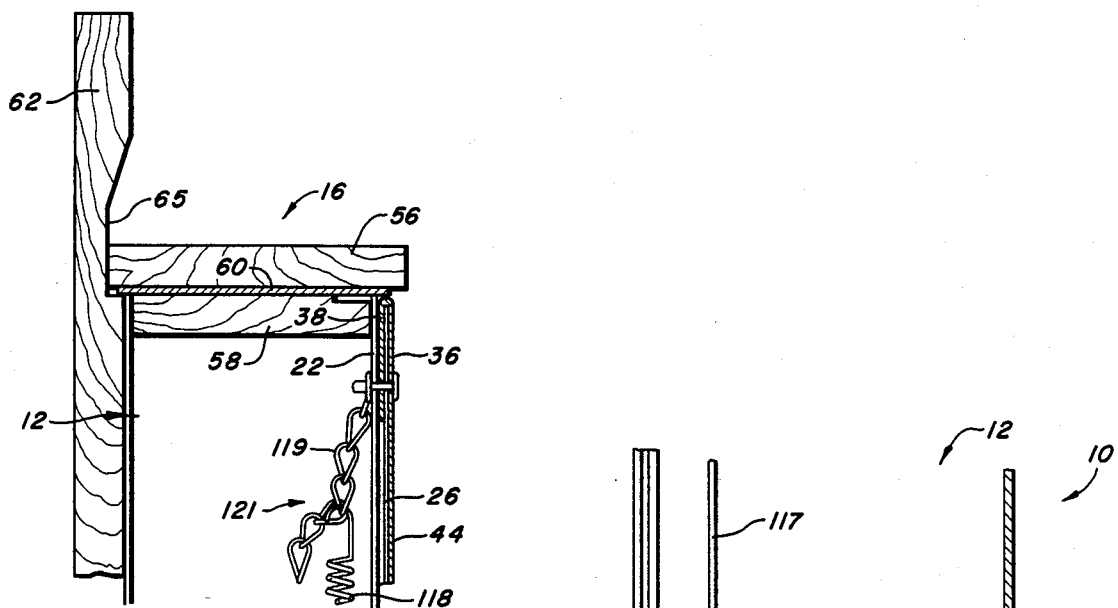
FIG. 5 is a side elevational view of a portion of the top of the squirrel-proof selective bird feeder according to the present invention.
Figure 6:
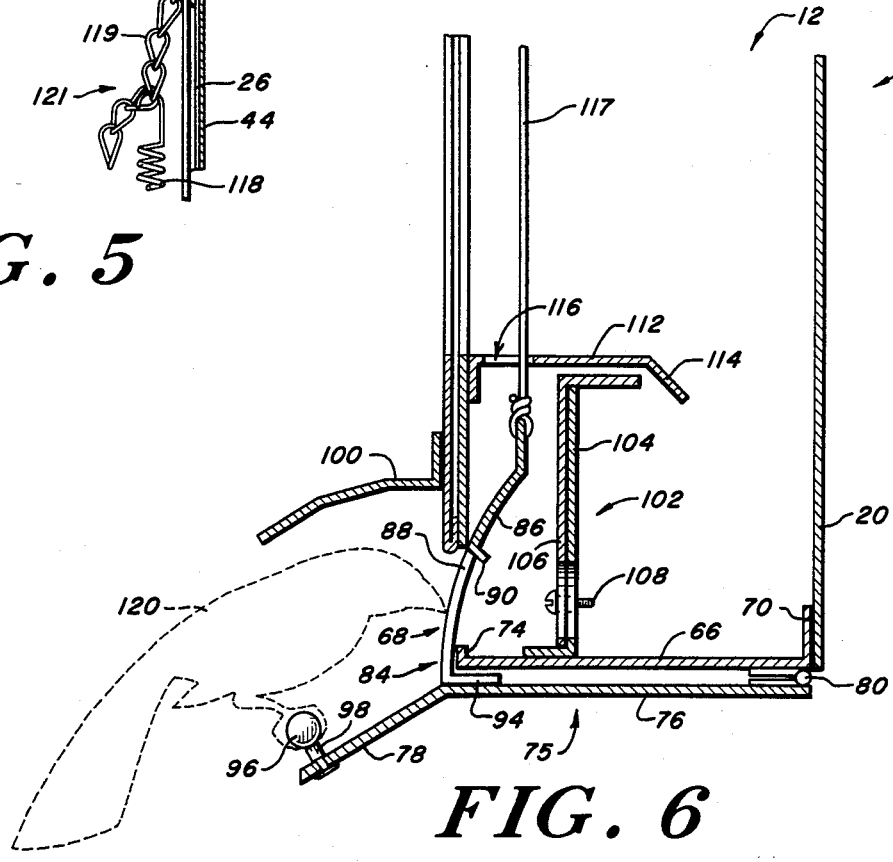
FIG. 6 is a sectional view of the bottom of the squirrel-proof selective bird feeder according to the present invention illustrating the feed portal in an open state.
Figure 7:
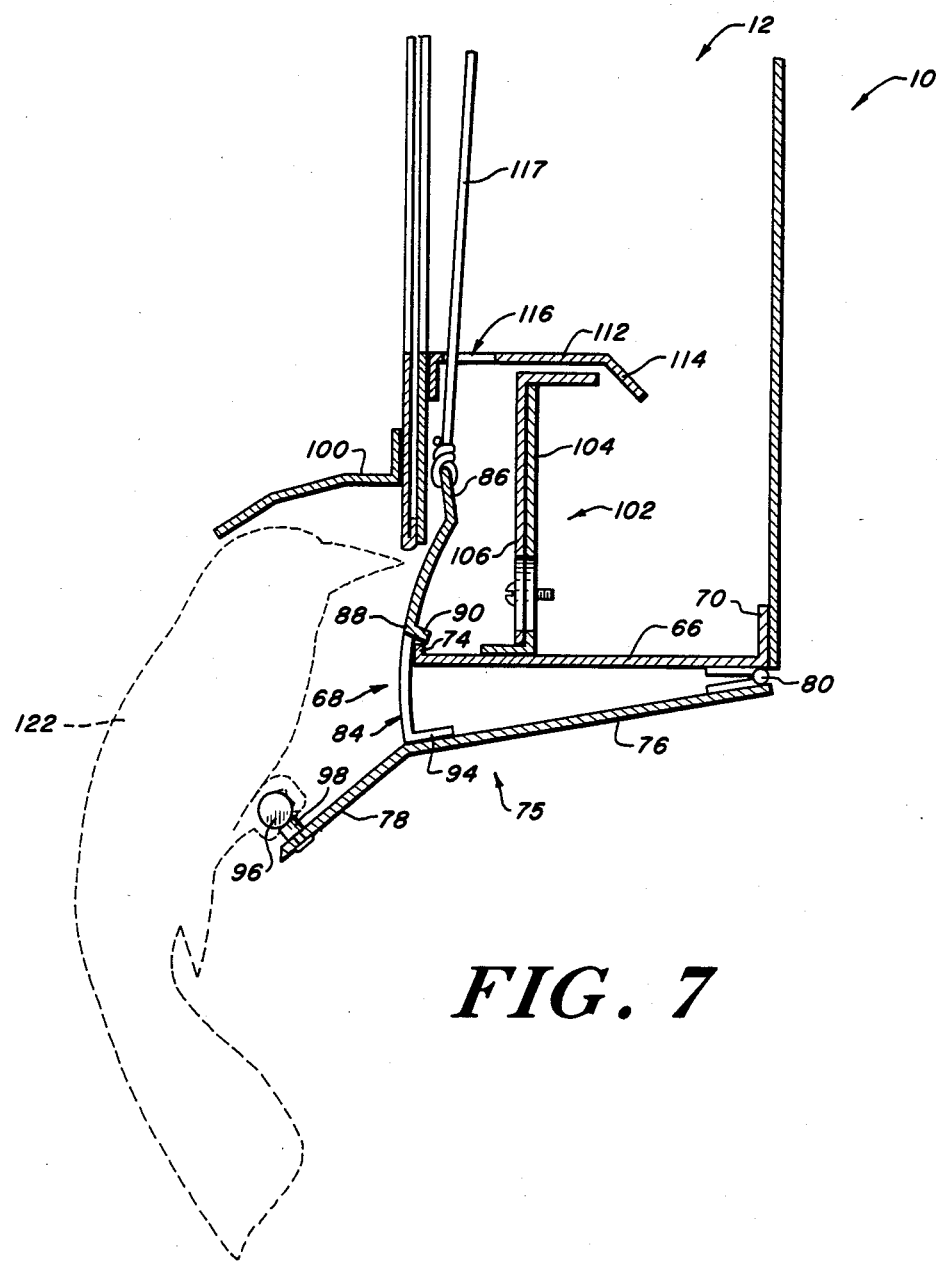
FIG. 7 is a sectional view of the bottom of the squirrel-proof selective bird feeder according to the present invention illustrating the feed portal in a closed state.

The cover 16 is slidably mounted into the open top of the hopper 12. The back wall 20, the side walls 18, and the lintel 36 define an opening having a generally rectangular cross-section. The cover 16 includes a generally rectangular member 56 preferably fashioned from aesthetically pleasing woods such as redwood, a second generally rectangular wood member 58 having peripheral dimensions less than the peripheral dimensions of the member 56, and an intermediate gnaw-proof metallic plate 60 sandwiched therebetween. The outside dimensions of the plate 60 are larger than the opening in the top of the hopper, so that when the cover 16 is received therein, as best shown in FIG. 5, the plate 60 rests on the top edge of the hopper 12 to prevent gnawing through the cover and exposing the feed supply in the hopper to squirrels. The peripheral dimension of the second wooden member 58 is selected to be just less than the inside dimension of the generally rectangular open top of the hopper 12 such that when the cover 16 is slidably mounted in the top top, the wooden member 58 is slidably received in the open top and frictionally engages the confronting walls in tight fitting relationship therewith. The peripheral dimension of the wooden member 56 is selected to be larger than the outer dimension of the open top so that when the cover 16 is inserted thereinto, the wooden member 56 extends outwardly beyond the outer dimension of the top of the hopper 12 thereby helping to prevent water seepage to the internal volume of the hopper and damaging the feed supply. The ends of the rivets 50 as best seen in FIG. 3 extend inwardly a short distance into the internal volume of the hopper 12, and are slidably received in respective holes 59 provided therefor on the confronting surface of the wooden member 58. To insert the cover 16 into the open top of the hopper 12, it is placed at an angle to the lintel 36 such that the apertures 59 provided in the member 58 slidably receive the inwardly extending ends of the rivets 50. Thereafter, the side of the cover 14 remote from the lintel is pushed downwardly into the open top, and is hinged by the cooperation of the inwardly projecting rivets 50 and the apertures 50 provided therefor in the member 58 against removal by force applied along the vertical plane.

A wooden mounting support 62 is threadably fastened or otherwise attached centrally to the back wall 20 of the hopper 12. Preferably, the ends of the support 62 extend beyond the ends of the hopper 12 to provide mounting flanges above and below the hopper. Apertures 64 are provided through the free ends of the support 62 by means of which it can be fastened to a suitable support such as a tree or a wall or any other support where it is desirable to mount the feeder. The support 62 has a dado contour 65 as best seen in FIG. 5 that provides a clearance in which the cover 16 swings when the cover 16 is inserted in the open top of the hopper, as above described.

A metallic bottom wall 66 is fastened to the open bottom of the hopper 12 in vertically spaced relation to the sill 30 defining a feed portal opening 68 having a generally rectangular geometry proximate the bottom of the hopper 12. The bottom wall includes a right angle flange 70 at the back that confronts the back wall 20 of the hopper 12, right angle side flanges 72 that confront the side walls 18 of the hopper 12, and a sealing lip 74 on the end of the bottom wall 66 remote from the back flange 70. The lip 74 catches the feed that flows into the feed portal 68. The bottom 66 is preferably riveted to the bottom end of the hopper 12 at spaced points through the upstanding side walls and upstanding back wall thereof.

The weight-responsive perch 14 includes a metallic plate generally designated 75 having a first generally rectangular portion 76 having an area that is substantially equal to the area of the bottom wall 66, and an integral generally rectangular portion 78 that is bent downwardly and to the side and extends outwardly beyond the front face of the hopper 12. The plate 75 is pivotally mounted by hinges 80 to the bottom wall 66 along the end thereof remote from the opening 68.

An upstanding metallic gate 84 is fastened to the end of the first portion 76 of the perch that is proximate to the opening 68. The gate 84 includes an arm 86 that extends across the opening 68 and is spaced vertically from the first portion 78 of the plate 75 on integral legs 88. A sealing lip 90 is provided on the arm 86 along the edge thereof that confronts the sealing lip 74 on the bottom wall 66. The arm 86 is provided with an inward bend centrally extending along the longitudinal length thereof to provide a clearance between the arm 86 and the sill 30. Preferably, the legs 88 are each provided with flanges 94 at right angles to the legs 88 which are affixed by rivets or welding to the bottom wall 66 for securing the gate 84 to the portion 76 of the plate 75.

A wooden dowel rod 96 or other suitable low-thermal conductivity member is fastened at the end of the second portion 78 of the perch remote from the point of pivotal attachment 80 of the perch to the bottom wall 66. The dowel 96 has a circular cross section easily grasped by the feet of the birds that alight on the perch 14 for feeding. The dowel 96 is preferably riveted in vertically spaced relation to the second portion 78 of the plate 75 on pedestals 98. In cold weather, any moisture present on the feet of birds in this manner fails to freeze the feet into potentially damaging engagement with the perch thereby preventing injury to the birds that feed during the cold winters typically endured by those birds that fail to migrate to warmer climates.

A sloping awning 100 is fastened adjacent the bottom of the hopper 12 in vertically spaced relation to the perch 14. The awning 100 is inclined outwardly and downwardly from the front face of the hopper and provides a roof-like projection that helps prevent squirrels and other undesirable animals from gaining access to the feed portal as well as helping to maintain the feed in a dry condition during wet weather.

An upstanding adjustable baffle 102 is fastened to the bottom wall 66 in spaced apart relation to the sealing 74 interiorly of the hopper. The adjustable baffle 102 includes an aperture plate 104 that is fastened by rivets or welded to the bottom wall 66 of the hopper 12. A second aperture plate 106 is slidably mounted to the aperture plate 104 preferably by a threaded fastener 108 through an elongated slot 110. The apertured plate 104 extends between the side walls 18 of the hopper 12, and the aperture plate 108 terminates short of the side walls of the hopper to allow a sliding movement thereof. The plate 106 is slidable with respect to the plate 104 to control the effective aperture size. In this manner, the bird feeder of the present invention is capable of accepting and regulating the flow of fine-grain feed, of coarse-grain feed, of elongated seed, and of shells, for example, as well as of the other types of commonly used feed.

A seed deflector 112 is fastened to the flanges 22, and to the awning 100, by rivets or any other suitable fasteners interiorly of the hopper. The seed deflector 112 has a length selected to just extend between the side walls 18 of the hopper 12, and a width that spans a portion of the dimension defined between the front and back of the hopper 12. The deflector 112 is provided with a downwardly depending flange 114 along the side thereof that is remote from its attachment points to the front face of the hopper 12. The seed deflector 112 is provided with an aperture 116 therethrough to be described. It is noted that the seed deflector and seed baffle can be constructed as an integral assembly as well without departing from the inventive concept.

A wire 117 is centrally fastened to the arm 86 of the gate 84. Preferably, the wire 117 is passed through an aperture provided in the arm and twisted around the arm to mechanically connect the wire to the arm. The wire 117 extends upwardly vertically through the aperture 116, which is of sufficient size to allow the wire 117 to freely pass therethrough, and is terminated on its other end to the lintel 36 via an adjustable tension coupling 121. The adjustable tension coupling preferably includes a spring 118 and a large-eye multiple link chain 119. The tension provided by the spring 118 urges the wire 117 upwardly, and thereby urges the gate 84 upwardly. The attachment point of the spring 118 with the chain 119 is selectable to controllably provide that spring force which prevents access to the feed portal by heavier-than-intended animals.

In operation, the weight of one or more small birds 120 that alight upon the perch 14 effects an unbalanced downward force that tends to rotate the perch on the hinge 80. Whenever the downward force produced by the weight of the birds is less than the force needed to overcome the tension provided by the spring 118, the perch remains in at least a partially open state, which allows the bird access to the feed that spills through the adjustable baffle 102 and is retained on the bottom wall 66 of the feed portal 68. In the case where a large bird 122, or a squirrel not illustrated, is on the perch having a weight that produces an unbalanced force on the perch that is greater than the force provided by the spring 118, the perch rotates about the hinge 80 downwardly to a closed state. In this case, the arm 86 of the gate 84 is displaced downwardly into the feed portal 68 until its sealing lip 90 abuts the sealing lip 32 providing an impediment in the feed portal 68 which prevents across to the feed. As soon as the heavier than desirable animal is no longer on the perch, it is urged upwardly by the spring 118, the arm 86 of the gate 84 moves out of the feed portal 68, and once again only birds having an intended weight are granted access to the feed.

It will be appreciated that many modifications of the presently disclosed invention are possible without departing from the scope of the appended claims.

What is claimed is:

1. A squirrel-proof selective bird feeder comprising:
   an integral gnaw-proof hopper having a rectangular cross section, an open top, an open bottom, a window receiving aperture, and an internal volume for containing a large quantity of bird feed;
   a gnaw-proof top member;
   first means for removably mounting said top member to the open top of the hopper in a water-resistant sealing engagement therewith;
   a bottom wall;
   second means for fastening said bottom wall to said open bottom of said hopper;
   a window;
   third means for fastening said window to said aperture in water-resistant sealing engagement with said hopper, and for providing a feed portal defining a plane proximate said bottom wall of said hopper in internal communication with said internal volume;
   a perch having a gate;
   fourth means for pivotally mounted said perch at said bottom of said hopper with said gate extending from said perch through said feed portal and into said internal volume of said hopper for rotation between a first position where said gate is inside said hopper and in an open state providing access to said feed portal, and a second position where said gate is substantially coincident with the plane of said feed portal and in a closed state denying access to said feed portal; and
   fifth means coupled to said perch for biasing said gate to said open condition.

2. The invention of claim 1, wherein said hopper is metallic.

3. The invention of claim 1, wherein said window is fashioned from translucent material.

4. The invention of claim 1, wherein said fourth means includes hinges threadably fastened to said bottom wall.

5. The invention of claim 1, wherein said fifth means includes an adjustable tension spring.

6. The invention of claim 1, further including a seed-deflecting baffle plate mounted in vertically spaced relation to said bottom wall, said plate having a length selected to be just less than the dimension defined between said side walls of said hopper, and a width that is selected to extend across only a portion of the dimension defined between the front and back walls of said hopper.

7. The invention of claim 1, further including a sloping awning fastened to said front face for preventing water damage to said feed portal and for preventing squirrels or other unwanted feeders from gaining access to the feed portal as a result of insufficient purchase.

8. The invention of claim 1, further including an adjustable baffle positioned proximate said feed portal to regulate the rate of flow of any one of plural feed types.

9. The invention of claim 1, wherein said hopper includes confronting front face flanges integral with corresponding ones of said side walls.

10. The invention of claim 9, wherein said third means includes a frame having a lintel having a window-receiving channel, a spaced-apart sill having a window-receiving channel, and first and second side rails.

11. The invention of claim 10, wherein said lintel, sill, and side rails are fastened to said hopper by means of rivets.

12. The invention of claim 1, wherein said top member includes a first member having peripheral dimensions larger than the external dimensions of said open top of said hopper, and a second member parallel and fastened to said first member having peripheral dimensions slightly less the internal dimensions of said open top of said hopper.

13. The invention of claim 12, wherein said first member of said top member is wooden.

14. The invention of claim 1, wherein said bottom wall includes a plate having a right angle back flange and right angle side flanges.

15. The invention of claim 14, wherein said bottom wall is metallic, and wherein said second means are rivets.

16. The invention of claim 1, wherein said perch includes a first member having a rectangular geometry that substantially is equal to the rectangular area defined by said bottom wall, and an integral second member outwardly extending beyond the front face of said hopper.

17. The invention of claim 16, further including a dowel fastened to said second member in vertically spaced relation therefrom.

18. A squirrel-proof selective bird feeder, comprising:
   a hopper having a bottom and a top, a feed portal defining a plane proximate the bottom, and an inside volume for receiving feed;
   a weight-responsive perch having an arm pivotally mounted to the bottom of the hopper that is rotatable between a first position where the arm is remote from the feed portal and inside said hopper, and a second position where the arm closes the feed portal and is substantially aligned with the plane defining the feed portal;
   an adjustable tensioning device positioned inside the hopper and including a coil spring connected to the perch and to the hopper for biasing the perch in said first position; and
   an adjustable baffle positioned in the hopper and proximate the feed portal for accepting and regulating the flow of any one of plural feed types.

19. The invention of claim 18, wherein the hopper has an open front face, and further including a window fastened to the open front face in water-resistant sealing engagement therewith to provide a visible indication of the feed supply.

20. The invention of claim 18, further including a sloping awning exteriorly fastened to the hopper proximate the feed portal.

21. The invention of claim 18, wherein the hopper has an open top, and further including a gnaw-proof top member slidably mounted in said open top.

22. The invention of claim 18, wherein said gnaw-proof top member includes a plate having an aperture, and further including a post projecting through said hopper and slidably received in said aperture when said top member is slidably received in said open top of said hopper.

23. The invention of claim 18, further including means for mounting said hopper to a support.

24. A squirrel-proof selective bird feeder, comprising:
   a hopper having a bottom and a top, a feed portal proximate the bottom, and an inside for receiving feed;
   a weight-responsive perch having an arm pivotally mounted to the hopper that is rotatable between a first position where the arm is remote from the feed portal, and a second position where the arm closes the feed portal;
   an adjustable tensioning device including a coil spring connected to the perch and mounted inside the hopper for biasing the perch in said first position; and
   an adjustable baffle positioned in the hopper and so spaced from the feed portal as to provide a feeding area therebetween, said baffle operative to accept and regulate the flow of any one of plural feed types from said inside to said feeding area.

* * * * *